(12) United States Patent
Hibino et al.

(10) Patent No.: US 12,230,795 B2
(45) Date of Patent: Feb. 18, 2025

(54) POSITIVE-ELECTRODE ACTIVE MATERIAL AND BATTERY

(71) Applicant: Panasonic Intellectual Property Management Co., Ltd., Osaka (JP)

(72) Inventors: Mitsuhiro Hibino, Kyoto (JP); Youshin Lee, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 618 days.

(21) Appl. No.: 17/475,461

(22) Filed: Sep. 15, 2021

(65) Prior Publication Data

US 2021/0408541 A1 Dec. 30, 2021

Related U.S. Application Data

(63) Continuation of application No. PCT/JP2020/026108, filed on Jul. 3, 2020.

(30) Foreign Application Priority Data

Aug. 7, 2019 (JP) ................. 2019-145559

(51) Int. Cl.
| | |
|---|---|
| *H01M 4/525* | (2010.01) |
| *H01M 4/02* | (2006.01) |
| *H01M 4/36* | (2006.01) |
| *H01M 10/36* | (2010.01) |
| *H01M 4/46* | (2006.01) |
| *H01M 10/054* | (2010.01) |

(52) U.S. Cl.
CPC ........... *H01M 4/525* (2013.01); *H01M 4/366* (2013.01); *H01M 10/36* (2013.01); *H01M 2004/028* (2013.01); *H01M 4/466* (2013.01); *H01M 10/054* (2013.01)

(58) Field of Classification Search
CPC ...... H01M 4/525; H01M 4/366; H01M 10/36; H01M 2004/028
See application file for complete search history.

(56) References Cited

U.S. PATENT DOCUMENTS

| | | | |
|---|---|---|---|
| 2014/0186716 A1* | 7/2014 | Wu | ........... H01M 10/0525 429/231.95 |
| 2016/0301063 A1* | 10/2016 | Yukinobu | ........... H01M 4/049 |
| 2017/0279151 A1 | 9/2017 | Ling et al. | |

FOREIGN PATENT DOCUMENTS

| | | | | |
|---|---|---|---|---|
| CN | 104103813 | | 10/2014 | |
| CN | 107946581 A | * | 4/2018 | |
| JP | 2002-025555 | | 1/2002 | |
| JP | 2015092473 A | * | 5/2015 | |
| WO | WO-2019031508 A1 | * | 2/2019 | ........ H01M 10/052 |

OTHER PUBLICATIONS

Machine English Translation for CN 107946581 A (Year: 2017).*

(Continued)

*Primary Examiner* — Matthew W Van Oudenaren
*Assistant Examiner* — Katherine N Higgins
(74) *Attorney, Agent, or Firm* — Rimon P.C.

(57) ABSTRACT

A positive-electrode active material for a magnesium secondary battery contains a composite oxide represented by the following composition formula:

$$M1_xM2_yO_2,$$

where M1 is sodium, M2 is nickel and manganese, and $0 < x+y \leq 2$.

3 Claims, 2 Drawing Sheets

(56) References Cited

OTHER PUBLICATIONS

Machine English Translation for JP 2015092473 A (Year: 2015).*
Machine English Translation for WO 2019031508 A1 (Year: 2019).*
Konarov et al. "Revisit of layered sodium manganese oxides: achievement of high energy by Ni incorporation." J. Mater. Chem. A, 2018,6, 8558-8567 (Year: 2018).*
Wang et al. "Dopant Segregation Boosting High-Voltage Cyclability of Layered Cathode for Sodium Ion Batteries." Adv. Mater. 2019, 31, 1904816 (Year: 2019).*
International Search Report of PCT application No. PCT/JP2020/026108 dated Sep. 24, 2020.

* cited by examiner

POSITIVE-ELECTRODE ACTIVE MATERIAL AND BATTERY

BACKGROUND

1. Technical Field

The present disclosure relates to a positive-electrode active material and a battery.

2. Description of the Related Art

Japanese Unexamined Patent Application Publication No. 2002-25555 discloses a layered magnesium composite oxide represented by the composition formula $Mg_xM1_{1-y}M2_yO_2$ or $Mg_xM1_{1-y}M2_yO_2 \cdot nH_2O \cdot M1$ is at least one selected from the group consisting of Mn and Fe, M2 is at least one selected from the group consisting of Al and the transition metals excluding M1, $0<x\leq0.5$, $0\leq y<0.4$, and n is between 0.4 and 0.6.

SUMMARY

In one general aspect, the techniques disclosed here feature a positive-electrode active material for a magnesium secondary battery. The positive-electrode active material contains a composite oxide represented by the following composition formula: $M1_xM2_yO_2$, where M1 is sodium, M2 is nickel and manganese, and $0<x+y\leq2$.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
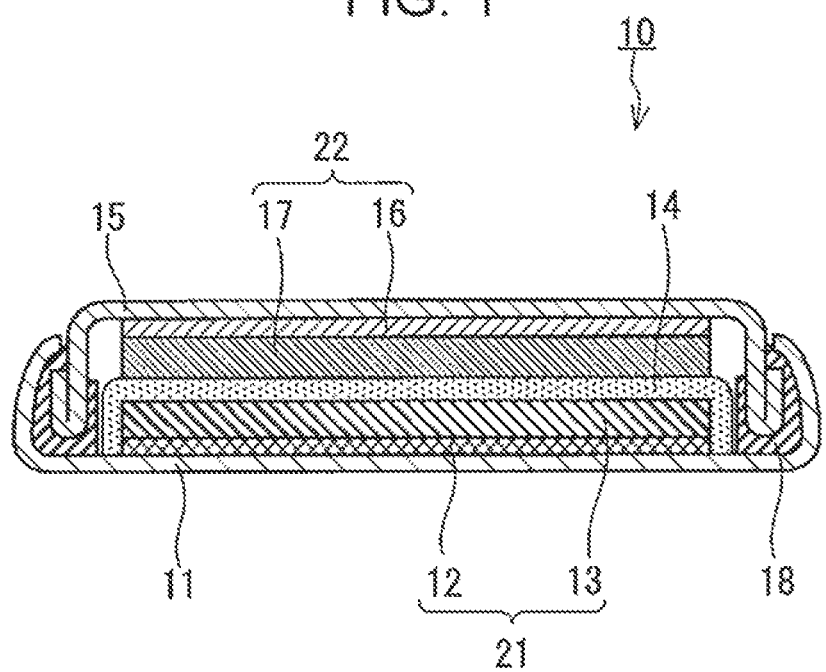
FIG. 1 is a cross-sectional diagram schematically illustrating an exemplary structure of a magnesium secondary battery.

Overview of Aspects of the Present Disclosure

A positive-electrode active material according to a first aspect of the present disclosure for a magnesium secondary battery contains a composite oxide represented by composition formula (1).

In formula (1), M1 is at least one alkali metal,
M2 is at least one transition metal, and
$0<x+y\leq2$.

According to the first aspect, there can be provided a high-capacity magnesium secondary battery.

In a second aspect of the present disclosure, for example, the composite oxide in the positive-electrode active material according to the first aspect for a magnesium secondary battery may have a P2 layered structure. Such a configuration ensures easy extraction and insertion of magnesium ions.

In a third aspect of the present disclosure, for example, the composite oxide in the positive-electrode active material according to the first or second aspect for a magnesium secondary battery may have a crystal structure that belongs to the space group P63/mmc. Such a configuration improves the composite oxide's conductivity to magnesium ions.

In a fourth aspect of the present disclosure, for example, the M1 for the positive-electrode active material according to any one of the first to third aspects for a magnesium secondary battery may be at least one selected from the group consisting of sodium and potassium. Such a configuration is an easy way to produce a composite oxide having a P2 layered structure.

In a fifth aspect of the present disclosure, the M2 for the positive-electrode active material according to any one of the first to fourth aspects for a magnesium secondary battery may be, for example, at least one selected from the group consisting of manganese, nickel, cobalt, and iron. Such a configuration gives the magnesium secondary battery a higher capacity.

A magnesium secondary battery according to a sixth aspect of the present disclosure includes:
a positive electrode that contains the positive-electrode active material according to any one of the first to fifth aspects for a magnesium secondary battery;
a negative electrode; and
an electrolyte that conducts magnesium ions.

According to the sixth aspect, the magnesium secondary battery has a high capacity.

The following describes embodiments of the present disclosure.

Embodiment 1

A positive-electrode active material according to Embodiment 1 for a magnesium secondary battery contains a composite oxide represented by composition formula (1).

In formula (1), M1 is at least one alkali metal,
M2 is at least one transition metal, and
$0<x+y\leq2$.

In this configuration, a magnesium secondary battery made with the active material has a high capacity.

If $x+y>2$ in composition formula (1), the composite oxide would be formed by fewer anionic atoms than cationic atoms. The crystal structure of the composite oxide, therefore, would not belong to the space group P63/mmc.

If $x+y>2$ in composition formula (1), the composite oxide would be lacking anions. When a magnesium secondary battery that contains such a composite oxide in its positive electrode is charged to extract magnesium ions from the composite oxide, the composite oxide would tend to lose its crystal structure. When the magnesium secondary battery is discharged thereafter, therefore, the magnesium insertion into the composite oxide would be inefficient. This would reduce the battery's capacity.

The composite oxide represented by composition formula (1) has a P2 layered structure. A P2 layered structure has triangular-prism sites between its layers, and at these triangular-prism sites the composite oxide is intercalated and deintercalated with magnesium ions. That is, when the magnesium secondary battery is charged, magnesium ions present at the triangular-prism sites are extracted, and when the magnesium secondary battery is discharged, magnesium ions are inserted into the triangular-prism sites.

By virtue of having a P2 layered structure, the composite oxide represented by composition formula (1) has a greater capacity for magnesium extraction and insertion, for example than the known positive-electrode active material of $V_2O_5$.

Hence the positive-electrode active material according to Embodiment 1 for a magnesium secondary battery is suitable for the purpose of giving a magnesium secondary battery a high capacity.

The composite oxide represented by composition formula (1), furthermore, has a crystal structure that belongs to the space group P63/mmc. A crystal structure that belongs to the space group P63/mmc is highly symmetric, and a composite oxide having a highly symmetric crystal structure conducts inserted ions well. The composite oxide according to Embodiment 1 is therefore highly conductive to magnesium ions, and a magnesium secondary battery made with it has a high capacity.

The composite oxide represented by composition formula (1), furthermore, maintains its layered structure even after charge and discharge and, therefore, can be easily intercalated and deintercalated with magnesium ions even after repeated charge and discharge. This also helps give the magnesium secondary battery a high capacity.

The positive-electrode active material according to Embodiment 1 for a magnesium secondary battery may be primarily the composite oxide.

This configuration gives the magnesium secondary battery a higher capacity.

"Being primarily the composite oxide" means the percentage of the composite oxide in the positive-electrode active material according to Embodiment 1 for a magnesium secondary battery is, for example, higher than or equal to 90% by weight.

In addition, the positive-electrode active material according to Embodiment 1 for a magnesium secondary battery may contain inevitable impurities, starting materials for and by-products from the synthesis of the composite oxide, decomposition products of the composite oxide, etc.

This configuration gives the magnesium secondary battery a higher capacity.

In composition formula (1), M1 may be at least one selected from the group consisting of sodium and potassium. Such a configuration is an easy way to produce a composite oxide having a P2 layered structure.

In composition formula (1), M2 includes at least one selected from the group consisting of manganese, nickel, cobalt, and iron. M2 may even be at least one selected from the group consisting of manganese, nickel, cobalt, and iron.

Such a configuration helps give the magnesium secondary battery a higher capacity.

Production of the Composite Oxide

The following describes an example of how to produce the composite oxide contained in the positive-electrode active material according to Embodiment 1 for a magnesium secondary battery.

An example of a process by which the composite oxide represented by composition formula (1) can be produced is as follows.

First, a raw material containing M1 and a raw material containing M2 are prepared.

M1 is, for example, Na. Examples of raw materials containing Na include oxides, salts, and sodium-transition metal composite oxides. Examples of oxides include $Na_2O$ and $Na_2O_2$. Examples of salts include NaF, $Na_2CO_3$, and NaOH. An example of a sodium-containing transition metal composite oxide is $NaMeO_2$, where Me denotes a transition metal.

M2 is, for example, a transition metal. Examples of raw materials containing M2 include oxides, salts, and hydroxides. An example of an oxide is M2203. Examples of salts include $M2CO_3$ and $M2NO_3$. Examples of hydroxides include $M2(OH)_2$ and M2OOH.

For example, if M2 is Mn, examples of raw materials containing Mn include $Mn_2O_3$, $MnCO_3$, $MnNO_3$, $Mn(OH)_2$, and MnOOH.

M2 may include, for example, Me1 and Me2. Each of Me1 and Me2 denotes a transition metal, and the transition metals denoted by Me1 and Me2 are of different kinds.

Amounts of the raw material containing M1 and that containing M2 are weighed out to a certain molar ratio in accordance with composition formula (1).

By doing this, the "x and y" in composition formula (1) can be changed within the range specified in composition formula (1).

The raw materials are then mixed together, for example by dry mixing or wet mixing. Calcining the resulting mixture at higher than or equal to 800° C. for longer than or equal to 10 hours gives a composite oxide represented by composition formula (1).

The composition of the resulting composite oxide can be determined by, for example, ICP emission spectrometry and inert gas fusion-infrared absorptiometry.

The space group of the resulting composite oxide can be determined by, for example, powder x-ray diffractometry.

Embodiment 2

The following describes Embodiment 2. What has already been described in Embodiment 1 may be omitted.

A battery according to Embodiment 2 includes a positive electrode that contains a positive-electrode active material according to Embodiment 1 for a magnesium secondary battery, a negative electrode, and an electrolyte that conducts magnesium ions.

In this configuration, the magnesium secondary battery has a high capacity.

The battery according to Embodiment 2 can be constructed as, for example, a magnesium secondary battery and nonaqueous electrolyte secondary battery.

That is, the negative electrode of the battery according to Embodiment 2 may contain a negative-electrode active material that can be intercalated and deintercalated with magnesium ions.

The electrolyte in the battery according to Embodiment 2 may be a nonaqueous electrolyte, typically a nonaqueous liquid electrolyte.

FIG. 1 is a cross-sectional diagram schematically illustrating an exemplary structure of a magnesium secondary battery 10 as an example of a battery according to Embodiment 2.

As illustrated in FIG. 1, the magnesium secondary battery 10 includes a positive electrode 21, a negative electrode 22, a separator 14, a casing 11, a cap 15, and a gasket 18.

The separator 14 is between the positive electrode 21 and the negative electrode 22.

The positive electrode 21, the negative electrode 22, and the separator 14 are impregnated with, for example, a nonaqueous electrolyte, typically a nonaqueous liquid electrolyte.

An electrode assembly formed by the positive electrode 21, the negative electrode 22, and the separator 14 is in the casing 11.

The casing 11 is closed with the gasket 18 and the cap 15.

The positive electrode 21 includes a positive-electrode current collector 12 and a positive-electrode active material layer 13 on the positive-electrode current collector 12. The positive-electrode active material layer 13 is between the positive-electrode current collector 12 and the separator 14.

The positive-electrode current collector 12 is made of, for example, of metal, such as aluminum, stainless steel, or an aluminum alloy.

In terms of shape, the positive-electrode current collector 12 may be a sheet or foil. A multilayer positive-electrode current collector 12 may also be used.

The positive-electrode current collector 12 is optional. If it is not used, the casing 11 serves as a positive-electrode current collector.

The positive-electrode active material layer 13 contains a positive-electrode active material according to Embodiment 1 for a magnesium secondary battery.

Optionally, the positive-electrode active material layer 13 may contain additives. Examples of additives include electrically conductive materials, ion conductors, and binders.

Examples of electrically conductive materials include carbon materials, metals, inorganic compounds, and electrically conductive polymers. Examples of carbon materials include graphite, acetylene black, carbon black, Ketjenblack®, carbon whiskers, needle coke, and carbon fiber. The graphite includes natural and artificial forms of graphite, and examples of natural graphite materials include vein and flake graphite. Examples of metals include copper, nickel, aluminum, silver, and gold. Examples of inorganic compounds include tungsten carbide, titanium carbide, tantalum carbide, molybdenum carbide, titanium boride, and titanium nitride. One of these materials may be used alone, or two or more may be used as a mixture.

Examples of binders include fluoropolymers, thermoplastic resins, ethylene propylene diene monomer (EPDM) rubber, sulfonated EPDM rubber, and natural butyl rubber (NBR). Examples of fluoropolymers include polytetrafluoroethylene (PTFE), polyvinylidene fluoride (PVdF), and fluororubbers, and examples of thermoplastic resins include polypropylene and polyethylene. One of these materials may be used alone, or two or more may be used as a mixture.

The positive-electrode active material, the electrically conductive material(s), and the binder(s) are dispersed in a solvent. Examples of solvents include N-methylpyrrolidone, dimethylformamide, dimethylacetamide, methyl ethyl ketone, cyclohexanone, methyl acetate, methyl acrylate, diethylenetriamine, N,N-dimethylaminopropylamine, ethylene oxide, and tetrahydrofuran. A thickening agent may be added to the dispersion. Examples of thickening agents include carboxymethyl cellulose and methyl cellulose.

An example of a process by which the positive-electrode active material layer 13 is formed is as follows. First, the positive-electrode active material, the electrically conductive material(s), and the binder(s) are mixed together. The resulting mixture is combined with an appropriate solvent to give a positive-electrode mixture in paste form. This positive-electrode mixture is applied to the surface of the positive-electrode current collector 12 and dried. The layer formed on the positive-electrode current collector 12 is the positive-electrode active material layer 13. The positive-electrode active material layer 13 may be compressed to increase the electrode density.

The thickness of the positive-electrode active material layer 13 is not critical. In an exemplary configuration, it is larger than or equal to 1 μm and smaller than or equal to 100 μm.

The negative electrode 22 includes a negative-electrode current collector 16 and a negative-electrode active material layer 17 under the negative-electrode current collector 16. The negative-electrode active material layer 17 is between the negative-electrode current collector 16 and the separator 14.

The negative-electrode current collector 16 is made of, for example, metal, such as aluminum, stainless steel, or an aluminum alloy.

In terms of shape, the negative-electrode current collector 16 may be a sheet or foil. A multilayer negative-electrode current collector 16 may also be used.

The negative-electrode current collector 16 is optional. If it is not used, the cap 15 serves as a negative-electrode current collector.

If the negative-electrode current collector 16 is made of a material on which magnesium precipitates and dissolves, the negative-electrode active material layer 17 is optional; it may be that a negative-electrode current collector 16 on which magnesium precipitates and dissolves is the only component of the negative electrode 22. In that case, the negative-electrode current collector 16 may be a piece of stainless steel, nickel, copper, or iron.

The negative-electrode active material layer 17 contains at least one negative-electrode active material capable of magnesium insertion and extraction. Examples of negative-electrode active materials include metals, carbon materials, oxides, nitrides, tin compounds, and silicon compounds.

For metals, both pure metals and alloys can be used. Examples of metals include magnesium metal and magnesium alloys. A magnesium metal can be, for example, an alloy of magnesium and at least one selected from the group consisting of aluminum, silicon, gallium, zinc, tin, manganese, bismuth, and antimony.

Examples of carbon materials include natural graphite, coke, graphitizing carbon, carbon fiber, spherical carbon, artificial graphite, and amorphous carbon.

To achieve a higher capacity per unit area, the negative-electrode active material may be at least one selected from the group consisting of silicon (Si), tin (Sn), silicon compounds, and tin compounds. Silicon and tin compounds may each be in alloy or solid solution form.

Examples of silicon compounds include $SiO_x$, where $0.05<x<1.95$. Compounds, alloys, and solid solutions obtained by replacing some silicon atoms in $SiO_x$ with at least one other element can also be used. The replacing element is at least one selected from the group consisting of boron, magnesium, nickel, titanium, molybdenum, cobalt, calcium, chromium, copper, iron, manganese, niobium, tantalum, vanadium, tungsten, zinc, carbon, nitrogen, and tin.

Examples of tin compounds include $Ni_2Sn_4$, $Mg_2Sn$, $SnO_x$, where $0<x<2$, $SnO_2$, and $SnSiO_3$. One tin compound selected from these may be used alone, or, alternatively, a combination of two or more tin compounds selected from these may be used.

Optionally, the negative-electrode active material layer 17 may contain additives. Examples of additives include electrically conductive materials, ion conductors, and binders. Examples of electrically conductive materials, binders, solvents, and thickening agents that can optionally be used are the same as those for the positive-electrode active material layer 13.

The thickness of the negative-electrode active material layer 17 is not critical. In an exemplary configuration, it is larger than or equal to 1 μm and smaller than or equal to 50 μm.

The shape of the negative-electrode active material is not critical either. A negative-electrode active material in any known shape can be used, such as particles or fibers.

The magnesium intercalation into the negative-electrode active material layer 17 can be by any method. Specific examples include (a) depositing magnesium on the negative-electrode active material layer by a gas-phase process, such as vacuum deposition and (b) putting a piece of magnesium foil on the negative-electrode active material layer and heating them. Both methods are based on thermal diffusion of magnesium into the negative-electrode active material layer. Alternatively, the magnesium intercalation into the negative-electrode active material layer can be through an electrochemical way. A specific example is to assemble a battery with a magnesium-free negative-electrode active material layer for its negative electrode and a piece of magnesium foil as its positive electrode and charge the battery to intercalate magnesium into the negative electrode.

Binders that can be used in the positive and negative electrodes 21 and 22 include polyvinylidene fluoride, polytetrafluoroethylene, polyethylene, polypropylene, aramid resins, polyamides, polyimides, polyamide-imides, polyacrylonitrile, polyacrylic acid, polymethyl acrylate, polyethyl acrylate, polyhexyl acrylate, polymethacrylic acid, polymethyl methacrylate, polyethyl methacrylate, polyhexyl methacrylate, polyvinyl acetate, polyvinylpyrrolidone, polyethers, polyethersulfones, hexafluoropolypropylene, styrene-butadiene rubber, and carboxymethyl cellulose. Copolymers of two or more materials selected from the group consisting of tetrafluoroethylene, hexafluoroethylene, hexafluoropropylene, perfluoroalkyl vinyl ethers, vinylidene fluoride, chlorotrifluoroethylene, ethylene, propylene, pentafluoropropylene, fluoromethyl vinyl ether, acrylic acid, and hexadiene may also be used. Mixtures of two or more of these materials can also serve as binders.

Electrically conductive materials that can be used in the positive and negative electrodes 21 and 22 include graphite, carbon black, electrically conductive fiber, fluorinated graphite, metal powders, electrically conductive whiskers, electrically conductive metal oxides, and organic electrically conductive materials. The graphite includes natural and artificial forms of graphite. Examples of types of carbon black include acetylene black, Ketjenblack, channel black, furnace black, lamp black, and thermal black. An example of a metal powder is an aluminum powder. Examples of electrically conductive whiskers include zinc oxide whiskers and potassium titanium oxide whiskers. An example of an electrically conductive metal oxide is titanium oxide. Examples of organic electrically conductive materials include phenylene derivatives.

The separator 14 can be a material having high ion permeability and sufficient mechanical strength. Examples of such materials include microporous thin film, woven fabric, and nonwoven fabric. Specifically, the separator 14 may be made of polyolefin, such as polypropylene or polyethylene. A polyolefin separator 14 not only delivers great durability but also provides a shutdown function when the battery 10 is exposed to excessive heat. The thickness of the separator 14 may be larger than or equal to 10 μm and smaller than or equal to 300 μm or may be larger than or equal to 10 μm and smaller than or equal to 40 μm. A single-layer separator 14, made of one single material, and a composite or multilayer separator 14, made of two or more materials, can both be used. The porosity of the separator 14 may be higher than or equal to 30% and lower than or equal to 70% or may be higher than or equal to 35% and lower than or equal to 60%. The term "porosity" refers to the percentage of the volume of voids to the total volume of the separator 14. An example of a method for measuring "porosity" is mercury intrusion porosimetry.

The electrolyte may be a material that conducts magnesium ions.

An example of an electrolyte is a nonaqueous liquid electrolyte. A nonaqueous liquid electrolyte contains at least one nonaqueous solvent and at least one magnesium salt dissolved therein.

Examples of magnesium salts include $MgBr_2$, $MgI_2$, $MgCl_2$, $Mg(AsFe)_2$, $Mg(ClO_4)_2$, $Mg(PFs)_2$, $Mg(BF_4)_2$, $Mg(CF_3SO_3)_2$, $Mg[N(CF_3SO_2)_2]_2$, $Mg(SbF)_2$, $Mg(SiF_6)_2$, $Mg[C(CF_3SO_2)_3]_2$, $Mg[N(FSO_2)_2]_2$, $Mg[N(C_2F_5SO_2)_2]_2$, $MgB_{10}Cl_{10}$, $MgB_{12}Cl_{12}$, $Mg[B(C_6F_5)_4]_2$, $Mg[B(C_6H_5)_4]_2$, $Mg[N(SO_2CF_2CF_3)_2]_2$, $Mg[BF_3C_2F_5]_2$, $Mg[PF_3(CF_2CF_3)_3]_2$, and $Mg[B(OCH(CF_3)_2)_4]_2$. The magnesium salt may be one of these substances or may be a combination of two or more. The concentration of the magnesium salt is in the range of, for example, 0.5 mol/liter to 2 mol/liter.

The nonaqueous solvent is selected from those commonly used in secondary batteries and can be of any kind as long as the magnesium salt dissolves therein. Examples of nonaqueous solvents include cyclic carbonates, linear carbonates, cyclic carboxylates, linear carboxylates, pyrocarbonates, phosphates, borates, sulfates, sulfites, cyclic sulfones, linear sulfones, nitriles, sultones, cyclic ethers, linear ethers, and amides.

Examples of cyclic carbonates include ethylene carbonate, propylene carbonate, butylene carbonate, vinylene carbonate, fluoroethylene carbonate, 4,5-difluoroethylene carbonate, 4,4,4-trifluoroethylene carbonate, fluoromethylethylene carbonate, trifluoromethylethylene carbonate, 4-fluoropropylene carbonate, and 5-fluoropropylene carbonate. Compounds derived from these by replacing a subset of or all hydrogen groups with fluorine can also be used. Examples of fluorinated compounds include trifluoropropylene carbonate and fluoroethylene carbonate.

Examples of linear carbonates include dimethyl carbonate, ethyl methyl carbonate, diethyl carbonate, methyl propyl carbonate, ethyl propyl carbonate, and methyl isopropyl carbonate. Compounds derived from these by replacing a subset of or all hydrogen groups with fluorine can also be used.

Examples of cyclic carboxylates include γ-butyrolactone, γ-valerolactone, γ-caprolactone, ε-caprolactone, α-acetolactone, and derivatives thereof.

Examples of linear carboxylates include methyl acetate, ethyl acetate, propyl acetate, butyl acetate, methyl propionate, ethyl propionate, propyl propionate, butyl propionate, and derivatives thereof.

Examples of pyrocarbonates include diethyl pyrocarbonate, di-tert-butyl dicarbonate, and derivatives thereof.

Examples of phosphates include trimethyl phosphate, triethyl phosphate, hexamethyl phosphoramide, and derivatives thereof.

Examples of borates include trimethyl borate, triethyl borate, and derivatives thereof.

Examples of sulfates include trimethyl sulfate, triethyl sulfate, and derivatives thereof.

Examples of sulfites include ethylene sulfite and derivatives thereof.

Examples of cyclic sulfones include sulfolane and derivatives thereof. Examples of linear sulfones include alkyl sulfones and derivatives thereof. Examples of nitriles include acetonitrile, valeronitrile, propionitrile, trimethylacetonitrile, cyclopentanecarbonitrile, adiponitrile, pimelonitrile, and derivatives thereof. Examples of sultones include 1,3-propanesultone and derivatives thereof.

Examples of cyclic ethers include 1,3-dioxolane, 4-methyl-1,3-dioxolane, tetrahydrofuran, 2-methyltetrahydrofuran, propylene oxide, 1,2-butylene oxide, 1,4-dioxane, 1,3,5-trioxane, furan, 2-methylfuran, 1,8-cineole, and crown ethers.

Examples of linear ethers include 1,2-dimethoxyethane, diethyl ether, dipropyl ether, diisopropyl ether, dibutyl ether, dihexyl ether, ethyl vinyl ether, butyl vinyl ether, methyl phenyl ether, ethyl phenyl ether, butyl phenyl ether, pentyl phenyl ether, methoxytoluene, benzyl ethyl ether, diphenyl ether, dibenzyl ether, o-dimethoxybenzene, 1,2-diethoxyethane, 1,2-dibutoxyethane, diethylene glycol dimethyl ether, diethylene glycol diethyl ether, diethylene glycol dibutyl ether, 1,1-dimethoxymethane, 1,1-diethoxyethane, triethylene glycol dimethyl ether, and tetraethylene glycol dimethyl ether.

An example of an amide is dimethylformamide.

The nonaqueous solvent may include glyme(s). Glymes can be bidentate ligands for magnesium ions. Using glyme(s) helps improve the solubility of magnesium imide salt(s) in the nonaqueous solvent. Examples of glymes include 1,2-dimethoxyethane (DME), diglyme, triglyme, and tetraglyme.

One nonaqueous solvent selected from these can be used alone, or, alternatively, a combination of two or more nonaqueous solvents selected from these can be used.

In terms of shape, the battery according to Embodiment 2 may be coin-shaped, cylindrical, square, sheet-shaped, button-shaped, flat-plate, or multilayer.

EXAMPLES

Example 1

Production of a Composite Oxide $Na_2CO_3$, $Ni(OH)_2$, and $Mn_2O_3$ powders were mixed in a molar ratio of 1.05:1:1.

The resulting mixture was calcined at 900° C. for 24 hours, giving a composite oxide of Example 1.

The resulting composite oxide was subjected to powder x-ray diffractometry.

Figure 2:
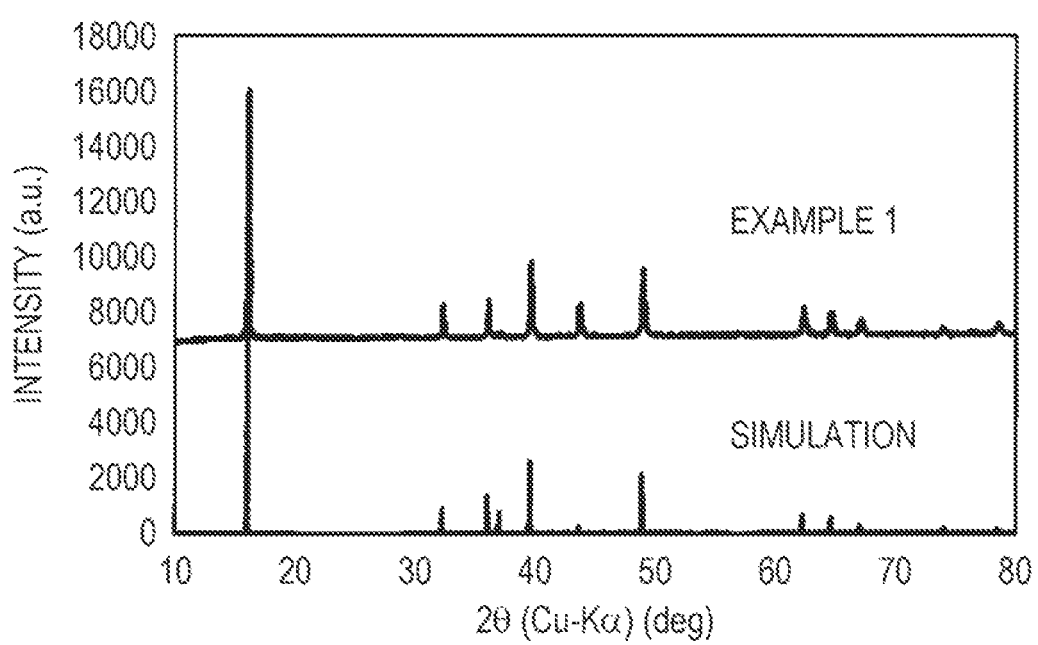
FIG. 2 presents a measured powder x-ray diffraction pattern of a composite oxide of Example 1 and a simulated powder x-ray diffraction pattern of a composite oxide.

The results are presented in FIG. 2.

The space group of the composite oxide was P63/mmc.

Then the composite oxide was analyzed by ICP emission spectrometry and inert gas fusion-infrared absorptiometry.

The composition of the composite oxide was $Na_{2/3}Ni_{1/3}Mn_{2/3}O_2$.

Fabrication of a Battery

Then 70 parts by mass of the composite oxide, 20 parts by mass of an electrically conductive material, 10 parts by mass of polyvinylidene fluoride (PVDF), and an appropriate amount of N-methyl-2-pyrrolidone (NMP) were mixed together, giving a positive-electrode mixture slurry.

The positive-electrode mixture slurry was applied to one side of a piece of 20-μm thick aluminum foil as a positive-electrode current collector.

The positive-electrode mixture slurry was dried and rolled, giving a 60-μm thick positive-electrode plate with a positive-electrode active material layer thereon.

A 5 mm×5 mm sheet was cut out of the positive-electrode plate. This sheet was used as the positive electrode.

A negative-electrode plate was obtained by cutting a 1-mm thick magnesium ribbon was to a length of 400 mm.

A nonaqueous liquid electrolyte was obtained by dissolving $Mg[N(CF_3SO_2)_2]_2$ in triglyme (G3) to a concentration of 0.5 mol/liter.

Comparative Example 1

A sample of Comparative Example 1 was obtained by pulverizing commercially available $V_2O_5$ at 300 rpm for 10 hours.

A battery was fabricated in the same way as in Example 1, except that the resulting $V_2O_5$ particles were used as the positive-electrode active material.

Testing of the Batteries

The battery of Example 1 was charged to a voltage of 3.2 V. The current at the positive electrode was set to 3.5 μA/g.

Then the battery of Example 1 was discharged at a current of 3.5 μA/g. The end-of-discharge voltage was set to 1.0 V.

The battery of Comparative Example 1 was charged to a voltage of 3.0 V. The current at the positive electrode was set to 10 μA/g.

Then the battery of Comparative Example 1 was discharged at a current of 10 μA/g. The end-of-discharge voltage was set to 1.0 V. The results are presented in Table 1.

TABLE 1

| | Composition of the composite oxide | Initial discharge capacity (mAh/g) |
|---|---|---|
| Example 1 | $Na_{2/3}Ni_{1/3}Mn_{2/3}O_2$ | 173 |
| Comparative Example 1 | $V_2O_5$ | 48 |

As shown in Table 1, the initial discharge capacity of the battery of Example 1 was 173 mAh/g. The initial discharge capacity of the battery of Comparative Example 1 was 48 mAh/g.

That is, the capacity of the battery of Example 1 was much greater than that of the battery of Comparative Example 1.

The measured powder x-ray diffraction pattern of the composite oxide of Example 1 before charge and discharge is presented in FIG. 2. A powder x-ray diffraction spectrum of a model was simulated using VESTA at the same time, assuming that $Na_{2/3}Ni_{1/3}Mn_{2/3}O_2$ has a P2 layered structure. The simulated spectrum is also presented in FIG. 2. The measured powder x-ray diffraction pattern of the composite oxide of Example 1 was in good agreement with the simulated spectrum, indicating that the composite oxide of Example 1 had a P2 layered structure before charge and discharge.

Figure 3:
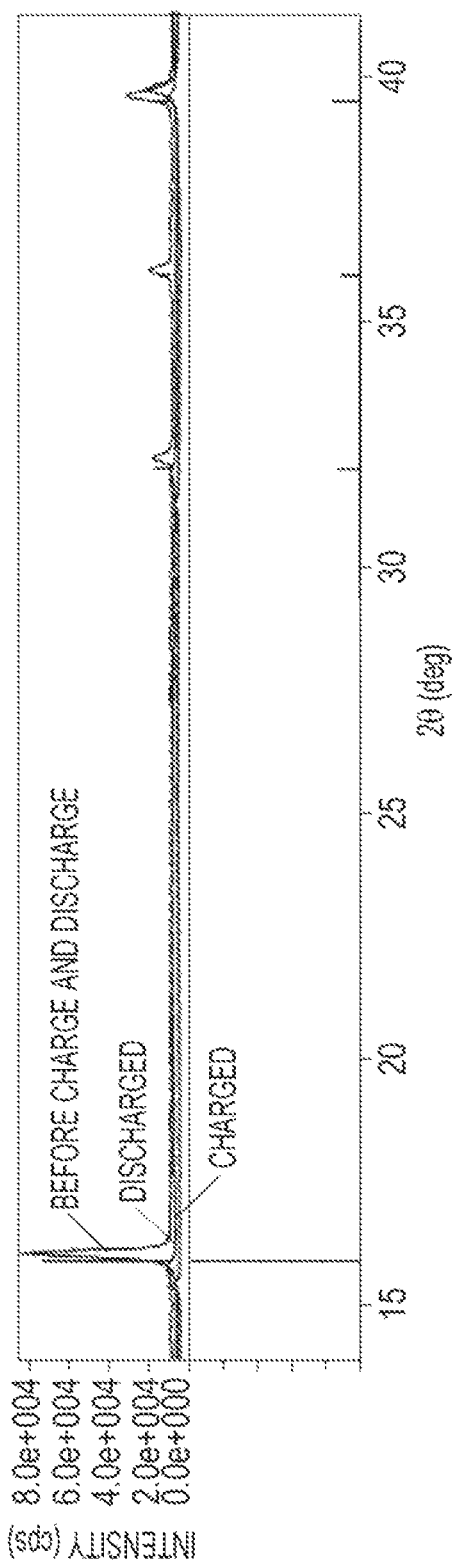
FIG. 3 presents measured and simulated powder x-ray diffraction patterns of the composite oxide of Example 1 before and after charge and discharge.

Measured and simulated powder x-ray diffraction patterns of the composite oxide of Example 1 before and after charge and discharge are presented in FIG. 3. The upper half of FIG. 3 presents the powder x-ray pattern of the composite oxide of Example 1 measured before charge and discharge, that of a charged composite oxide of Example 1, and that of a discharged composite oxide of Example 1. The lower half of FIG. 3 presents a simulated powder x-ray diffraction spectrum of the composite oxide of Example 1 before charge and discharge. The position of the peak near an angle 2θ of 15° indicates the interlayer distance of the composite oxide.

When the peak near an angle 2θ of 15° is compared, it is found that charging the composite oxide shifted the peak to lower angles compared with that before charge and discharge, and discharging shifted the peak to higher angles compared with that in the spectrum of the charged composite oxide. Charge and discharge therefore changed the interlayer distance of the composite oxide, suggesting that charging caused sodium ions to be extracted from the composite oxide and that discharging caused magnesium ions to be inserted into the composite oxide.

As can be seen from the measured powder x-ray diffraction patterns in FIG. 3, furthermore, no new peak emerged in association with charge and discharge. The only finding is peak shifts, which means the composite oxide of Example 1 maintained its layered structure even after magnesium extraction and insertion. By virtue of its capability to maintain its layered structure, the composite oxide of Example 1 can be easily intercalated and deintercalated with magnesium ions even after charge and discharge. Overall, a magnesium secondary battery made with it has a high capacity.

The positive-electrode active material according to an aspect of the present disclosure for a magnesium secondary battery can be used in magnesium secondary batteries.

What is claimed is:

1. A magnesium secondary battery comprising:
   a positive electrode that contains a composite oxide as a positive-electrode active material;
   a negative electrode; and
   an electrolyte that conducts magnesium ions,
   wherein the composite oxide is, in an initial state, represented by the following formula $Na_xM_yO_2$,
   where M is nickel and manganese, and
   $0 < x+y \leq 2$,
   wherein the composite oxide, in a state after charge and discharge, contains magnesium ions, with which sodium ions of the composite oxide in the initial state are replaced, and
   wherein the magnesium ions replacing the sodium ions of the composite oxide in the initial state are provided by the electrolyte.

2. The magnesium secondary battery according to claim 1, wherein the composite oxide has a P2 layered structure.

3. The magnesium secondary battery according to claim 1, wherein the composite oxide has a crystal structure that belongs to a space group P63/mmc.

* * * * *